United States Patent
Demulder et al.

(10) Patent No.: US 9,936,646 B2
(45) Date of Patent: Apr. 10, 2018

(54) LIGHT WEIGHT NEEDLE CONSTRUCTION FOR DELIVERING TWINE IN A LARGE SQUARE BALER

(71) Applicant: DEERE & COMPANY, Moline, IL (US)

(72) Inventors: Carl F. Demulder, Ottumwa, IA (US); Gregory S. McCunn, Orion, IL (US)

(73) Assignee: DEERE & COMPANY, Moline, IL (US)

( * ) Notice: Subject to any disclaimer, the term of this patent is extended or adjusted under 35 U.S.C. 154(b) by 820 days.

(21) Appl. No.: 14/539,348

(22) Filed: Nov. 12, 2014

(65) Prior Publication Data

US 2016/0128280 A1    May 12, 2016

(51) Int. Cl.
*A01F 15/14*    (2006.01)
*A01D 59/06*    (2006.01)

(52) U.S. Cl.
CPC .............. *A01F 15/14* (2013.01); *A01D 59/06* (2013.01); *A01F 15/145* (2013.01)

(58) Field of Classification Search
CPC ........ A01F 15/12; A01F 15/14; A01F 15/145; B65B 13/02; A01D 59/06
USPC .................................................. 100/19 R, 24
See application file for complete search history.

(56) References Cited

U.S. PATENT DOCUMENTS

| | | | |
|---|---|---|---|
| 274,909 A * | 4/1883 | Clow | A01D 59/06 56/448 |
| 3,126,815 A * | 3/1964 | May | A01F 15/12 100/24 |
| 4,102,260 A * | 7/1978 | White | A01F 15/14 100/24 |
| 4,463,668 A * | 8/1984 | Jackson | A01F 15/14 100/24 |
| 5,222,297 A | 6/1993 | Graff et al. | |
| 7,232,386 B2 | 6/2007 | Halko et al. | |
| 7,458,620 B2 | 12/2008 | Rotole et al. | |
| 8,069,780 B2 | 12/2011 | Demulder et al. | |
| 8,216,096 B2 | 7/2012 | McGrath et al. | |
| 8,671,834 B1 | 3/2014 | Rotole et al. | |
| 2005/0124475 A1* | 6/2005 | Chapman | A63B 21/00 482/142 |
| 2014/0290504 A1* | 10/2014 | Lang | A01F 15/14 100/3 |

FOREIGN PATENT DOCUMENTS

| | | |
|---|---|---|
| AU | 2012203960 A1 | 7/2012 |
| GB | 1245600 A | 9/1971 |
| WO | 9308017 A1 | 4/1993 |

OTHER PUBLICATIONS

European Search Report in foreign counterpart application No. 15191819.0 dated Mar. 30, 2016 (5 pages).

* cited by examiner

*Primary Examiner* — Jimmy T Nguyen
*Assistant Examiner* — Gregory Swiatocha

(57) ABSTRACT

A twine delivery needle is constructed so as to include metal tip and mounting base sections or regions joined together by a relatively light weight central section having a composite structural sandwich construction comprising a low-density rigid foam core encased within a thin, high strength, skin or covering comprised of plies of woven and substantially continuous fibers disposed within a hardened matrix resin material.

19 Claims, 6 Drawing Sheets

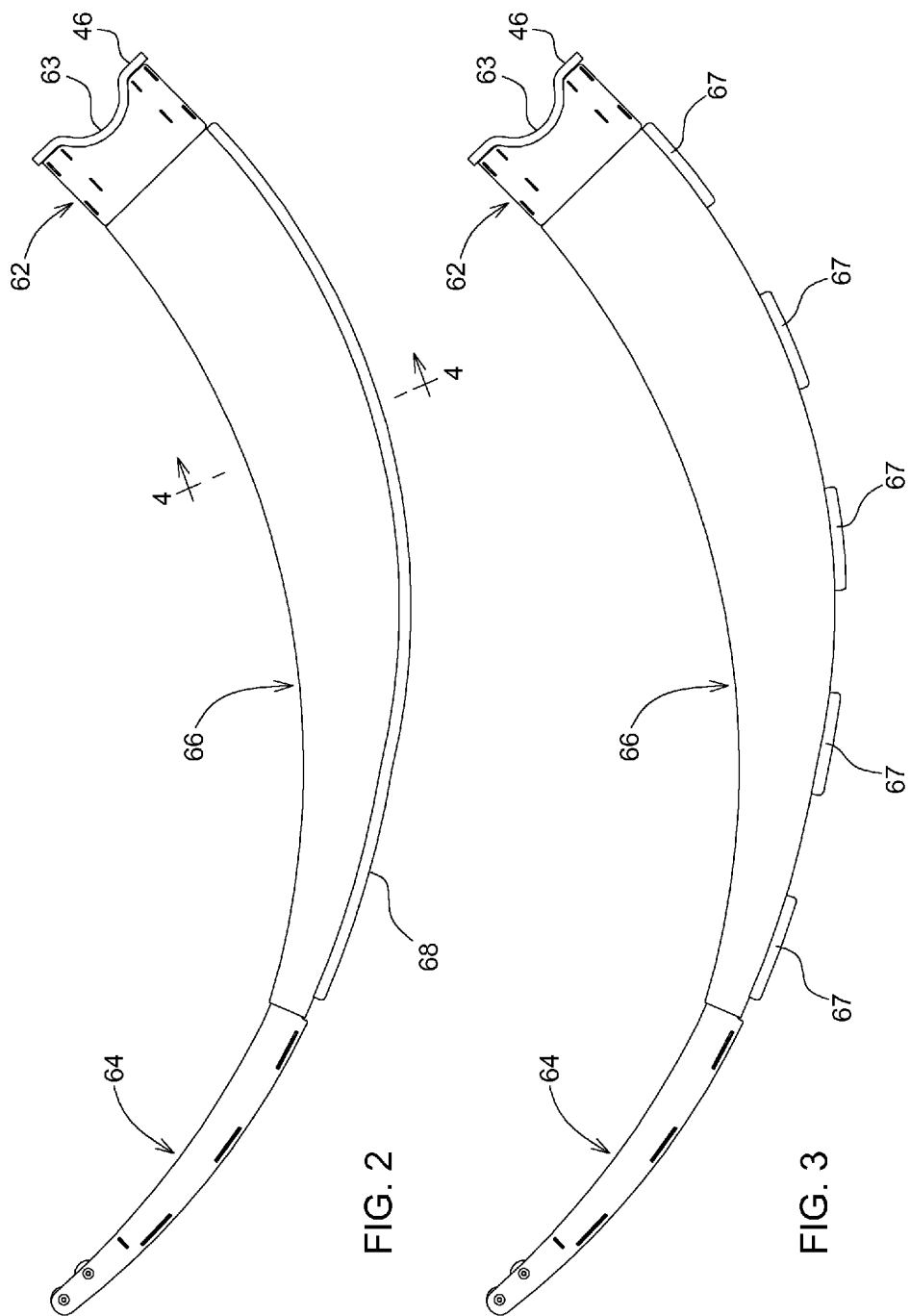

LIGHT WEIGHT NEEDLE CONSTRUCTION FOR DELIVERING TWINE IN A LARGE SQUARE BALER

FIELD OF THE INVENTION

The present invention relates to tying mechanisms for tying loops of twine about large parallelepiped bales formed in a bale case of a so-called large square baler, and more specifically, relates to the construction of twine-delivery needles of such tying mechanisms.

BACKGROUND OF THE INVENTION

A twine delivery needle arrangement of a large square baler includes needles mounted to a needle yoke or frame which is mounted to a baling chamber for pivoting so that twine-carrying tip sections of the needles move upwardly through the baling chamber from a location below the baling chamber to deliver respective lengths of twine to knotters forming part of a knotter table mounted to a top wall of the baling chamber. The needle yoke is U-shaped and includes a pair of parallel arms respectively joined at right angles to opposite ends of a cross tube that extends beneath the baling chamber. The number of needles used depends on the number of loops needed to adequately bind a bale of a given size, with common bale sizes requiring four or six loops and thus four or six needles, for example. Each needle includes a base mounted to the cross tube by a clamp which has four bolts. The cross tube of the needle yoke extends transversely below the baling chamber, with the parallel arms of the yoke having upper ends pivotally mounted on opposite sides of the baling chamber for rotation about a horizontal transverse axis. The needle yoke arms are respectively coupled to opposite ends of a knotter gear drive shaft of the knotter table by four-bar linkages. One tie cycle is 180° rotation of the needle yoke over 360° rotation of the knotter gear drive shaft, which in a known design operates at 45 RPM. During a first half of a tying cycle, the knotter gear drive shaft rotates 180° with the needle yoke initially rotating 90° so as to carry the needles upwardly from a home position (0° needle yoke rotation), wherein the twine-carrying tip sections of the needles are beneath the baling chamber, to a top dead center (TDC) position, wherein the twine-carrying tip sections of the needles project into the knotter table. During a second half of the tying cycle, the motion of the needle yoke reverses and it rotates 90° back to the home position. This movement of the needles during a tying cycle is accommodated by vertically aligned needle slots, respectively provided in the bottom and top walls of the baling chamber, a bottom wall of the knotter table and in a baler plunger positioned in a rearward compaction stroke (U.S. Pat. No. 8,069,780, granted Dec. 6, 2011 clearly shows needle clearance slots provided in a plunger and is incorporated herein by reference in its entirety).

A typical twine-delivery needle of a known design is constructed of metal and weighs about 20 pounds. A known baler is equipped with six twine-delivery needles which are carried by a yoke which weighs about 150 pounds. Therefore, the total weight of the needle arrangement (weight of needles plus weight of needle support yoke) is about 270 pounds, resulting in substantial torque being required to get the needle system moving, and, thereafter, in substantial inertia being developed as the needles move between the home and TDC positions causing over-running unless a damper is used. Since the needle arrangement is linked for being driven by the knotter gear drive shaft, substantial cross bracing is required between the drive shaft and the pivot structure of the needle yoke in order to provide sufficient strength for accommodating the initial torque requirement. Also, the yoke arms must be constructed to have sufficient rigidity to prevent the yoke from twisting due to the initial torque requirement. The aforementioned U.S. Pat. No. 8,671,834, granted Mar. 18, 2014 discloses a needle arrangement of the above-described type.

Another drawback of using metal needles is that, if the needles are stranded in the bale chamber or are mistimed relative to the stroke of the plunger for compacting crop material in the baling chamber, the plunger will contact the needles and cause major damage to one or more of the needle arrangement, the plunger system and the knotter table, which includes the knotter gear drive shaft.

The problem to be solved then is that of reducing the weight of the needle arrangement while maintaining sufficient strength in the needles for preventing them from being deflected sideways resulting in interference and possible damage.

SUMMARY OF THE INVENTION

Accordingly, it is an object of the present invention to provide a needle arrangement designed for overcoming the above-noted drawback of being too heavy that is associated with known needle arrangements.

This object is accomplished by a needle design which includes a light-weight composite central section extending between, and joined to, a metal needle tip section and a metal needle base. The composite central section is of a structural sandwich construction including a low-density rigid foam core comprised of formulations of syntactic or non-syntactic foam such as polyurethane, poly vinyl chloride or epoxy material encased in a thin, high strength skin or covering comprised of plies of woven and substantially continuous fibers, such as carbon fibers, disposed within a hardened matrix resin material. In one design where the needle arrangement included six needles, needles constructed with the composite central section were 46% lighter in weight than prior art needles constructed of steel.

BRIEF DESCRIPTION OF THE DRAWINGS

FIG. 2 is an enlarged left side perspective view of the twine-delivery needle shown in FIG. 1.

FIG. 3 is a left side perspective view of the twine-delivery needle shown in FIG. 2, but with twine guide channel segments being used in lieu of the twine guide channel.

DESCRIPTION OF THE PREFERRED EMBODIMENT

Figure 1:
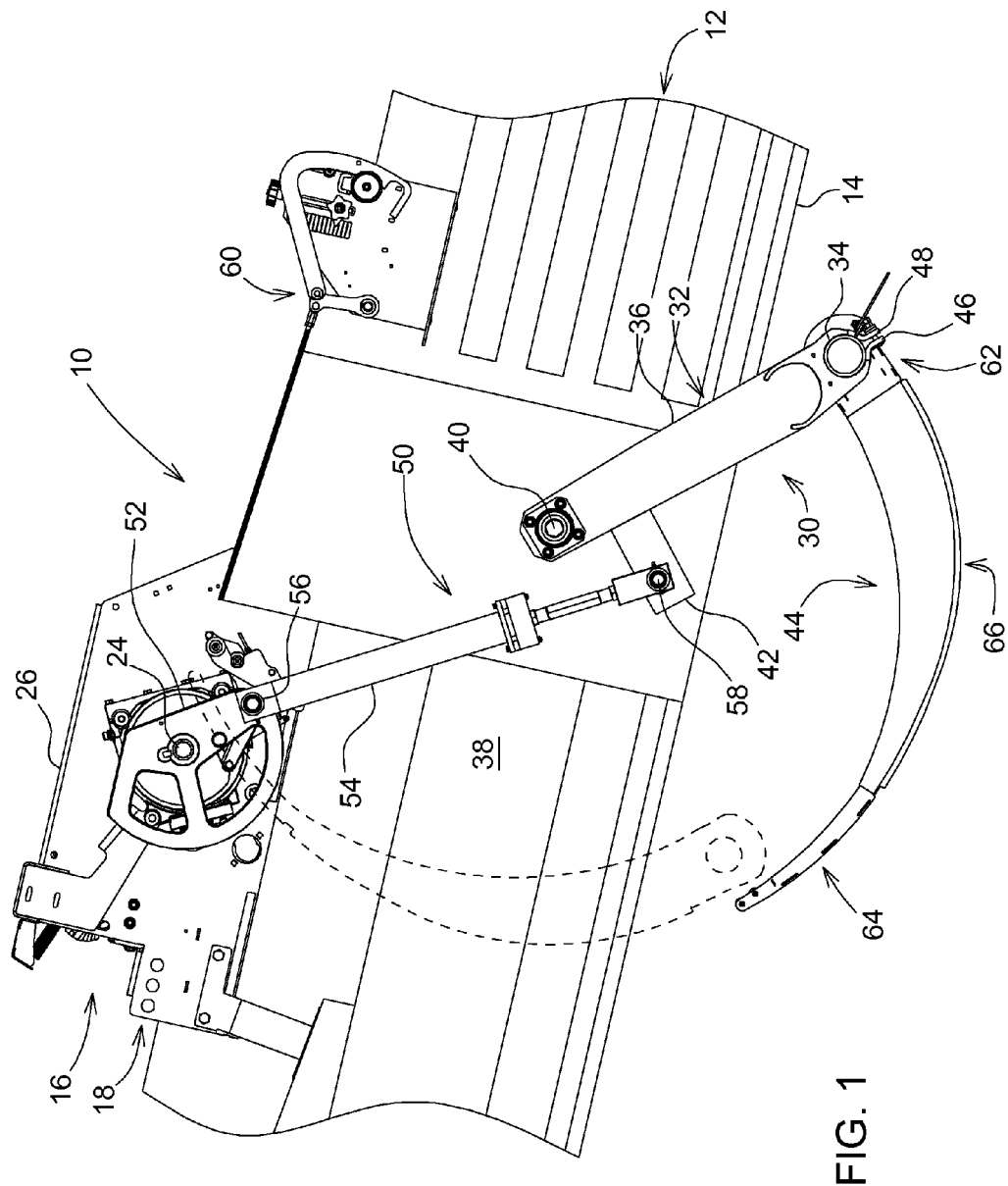
FIG. 1 is a fragmentary left side view of a central location of a baling chamber of a large square baler showing a needle yoke of a twine-delivery needle arrangement equipped with needles (only one visible), constructed in accordance with the principles of the present invention, and shown in a solid line home position and shown in a dashed line top dead center position.

Referring to FIG. 1, there is shown a portion of a large square baler 10 including a middle section of a fore-and-aft extending baling chamber 12 including a bottom wall 14 and a top wall (not visible in FIG. 1) to which a knotter table 16 is mounted. The knotter table 16 is constructed like the knotter table disclosed in U.S. Pat. No. 8,671,834 granted on Mar. 18, 2014 and incorporated herein by reference in its entirety. Thus, the knotter table 16 forms part of a tying system for tying six loops of twine about each large parallelepiped bale formed in the baling chamber 12 and is mounted to a front region of the top wall of the baling chamber 12, with it being noted that the number of loops of twine to be tied depends upon the size of bale being formed. Accordingly, for balers for making bales of different sizes, a knotter table for tying a different number of loops of twine may be used without departing from the principles of the present invention. In any event, the knotter table 16 includes a support frame 18 comprising a bottom wall 20 (see FIG. 8) including a plurality (only one shown) of transversely spaced, parallel, longitudinally extending bottom wall segments 22 defining six longitudinal needle clearance slots (not shown). The knotter table 16 further includes a horizontal, transverse knotter gear drive shaft 24 having opposite end regions rotatably supported in the right and left side walls, with only a left side wall 26 being shown. Six (only one visible) knotter gears 28 (see FIG. 8) are respectively mounted at equally spaced locations along the drive shaft 24 for rotation with the drive shaft, which is driven by a shaft and gearing arrangement carried by the baler (not shown) coupled for being driven by a power take-off shaft of a tractor (also not shown) coupled for towing the baler 10.

A twine-delivery needle arrangement 30 includes a needle support frame or yoke 32 constructed from a transverse, cylindrical tubular needle support member 34 having opposite end regions to which right- and left-hand arms are respectively fixed at right angles to the support member, with only the left-hand arm 36 being visible. Upper ends of the arms are pivotally mounted to right and left side walls of the baling chamber 12 for swinging about a horizontal transverse axis defined by respective right and left pivot bolts, with only the left-hand side wall 38 and left-hand pivot bolt 40 being visible. A crank arm 42 is joined to a forward side of the left-hand yoke arm 36. A plurality of identical, elongate, curved, twine-delivery needles, of which only a left-most needle 44 is visible, respectively project forwardly from, and have respective base end connection plates 46 fixed to, a plurality of mounting plates 48 fixed at equally spaced locations across a length of the tubular needle support member 34. The transverse spacing between the needles 44 matches the spacing between respective clearance slots (not shown) formed between parallel, transversely spaced longitudinally extending members of each of the bottom wall 14 and top wall (not shown) of the baling chamber 12, and bottom wall 20 of the knotter table 16, which is mounted to the top wall of the baling chamber, with the slots in the bottom and top walls of the baling chamber being vertically aligned with each other and with the slots in the bottom wall of the knotter table 16. These aligned slots permit the twine-carrying needles 44 to travel upwardly through the baling chamber 12 and project into the knotter table 16 as they travel between a home position located beneath the baling chamber 12, as shown in solid lines in FIG. 1, and a tying or top dead center (TDC) position, wherein an upper end of each needle is located beside an associated knotter arrangement 45 which includes a respective one of the plurality of knotter gears 28.

A needle drive linkage assembly 50 is provided for moving the needles 44 between the home and tying or TDC positions during a tying cycle and includes a lift arm 52 fixed to, and rotatable together with, a left end of the knotter gear drive shaft 24. The linkage assembly 50 further includes an elongate lift link 54 having an upper end pivotally coupled to the lift arm 52 by a pivot pin 56, and having a lower end pivotally coupled to a forward end of the crank arm 42 fixed to the yoke arm 36 by a pivot pin 58. A similar drive linkage assembly can be provided between the right-hand end of the drive shaft 24 and the right-hand arm of the needle support frame or yoke 32. Counterclockwise rotation, the direction of rotation of the drive shaft 24, as viewed in FIG. 1, will result in the lift arm 52 acting to pivot the needle arrangement 30 clockwise about the transverse pivot bolt 40. A startup torque spike will be generated at the beginning of a tying cycle which is initiated through the action of a clutch-operating linkage 60 for being operated by a bale length measuring device (not shown) when a bale has reached a preset finished length sensed by the measuring device, the linkage 60 being operatively coupled to a clutch (not shown) provided for coupling an input drive (not shown) to the drive shaft 24. It will be appreciated that the startup torque at the beginning of a tying cycle and inertia of the needle arrangement 30 once it begins to move will both be proportional to the weight of the needle arrangement. Therefore, it is desirable that the weight of the needle arrangement be minimized.

The present invention has been developed in order to reduce the weight of the needle arrangement 30 by reducing the weight of the needles 44. With this in mind, and with reference also to FIGS. 2 and 3, each of the needles 44 is constructed to include a metal base section 62 (formed in part by the base end connection plate 46), a metal tip section 64 and a composite middle section 66 extending between and being joined, in a manner described below, to the base and tip sections. Mounted to a forward side of the composite middle section 66, as considered in the TDC position of FIG. 1, is a metal U-shaped twine guide channel member 68 that has opposite ends respectively terminating adjacent the base section 62 and the tip section 64. The channel member 68 is appropriately securely attached to the middle section 66 by self-tapping screws (not shown) and/or adhesive. While the provision of a U-shaped twine guide that extends between the base and tip sections of a baler needle is not new per se, see U.S. Pat. No. 4,102,260, granted Jul. 25, 1978, for example, such a guide is especially important in conjunction with a needle having a composite middle section since without it the twine being delivered will run against and wear a groove in the composite material. However, it is noted that protection of the composite material can be accomplished by using a plurality of short U-shaped guide segments 67 (see FIG. 3) spaced incrementally along the forward side of the composite middle section in lieu of the channel member 68. The plurality of guide segments 67 are spaced from each other a distance sufficient for keeping the guided twine out of contact with the composite material and are secured to the composite material, in a manner similar to that of attaching the channel member 68, by using self-tapping screw fasteners or adhesive or both. The total weight of the guide segments 67 would of course be less than the weight of the channel member 68 and result in the total weight of the needle arrangement 30 being less.

Figure 4:
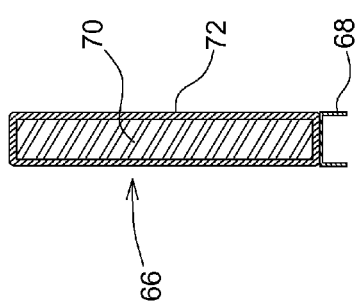
FIG. 4 is a sectional view taken along the line 4-4 of FIG. 2.

As can best be seen in FIG. 4, the middle section 66 includes a rigid foam core element 70, which may be comprised of formulations of expanding syntactic or non-syntactic, rigid foam such as polyurethane, PVC or epoxy. Covering at least an entire length of the foam core element 70 extending between the base end section 62 and the tip section 64 is a thin (approximately 0.02" depth), high strength, skin 72 comprised of one or more plies of woven and substantially continuous fibers disposed within a hardened or heat cured matrix resin material. These fibers are preferably carbon fibers, but may be any other type of fibers, such as aramid or glass fibers, for example, used to strengthen rigid foam cores. Opposite end sections of the foam core element 70 are respectively received in a socket or receptacle formed by the metal base section 62 and partially enclosed by sheet metal sides forming the tip section 64. An entire length of the foam core element 70, including these opposite end sections, could be encased in the skin 72, if desired.

Figure 5:
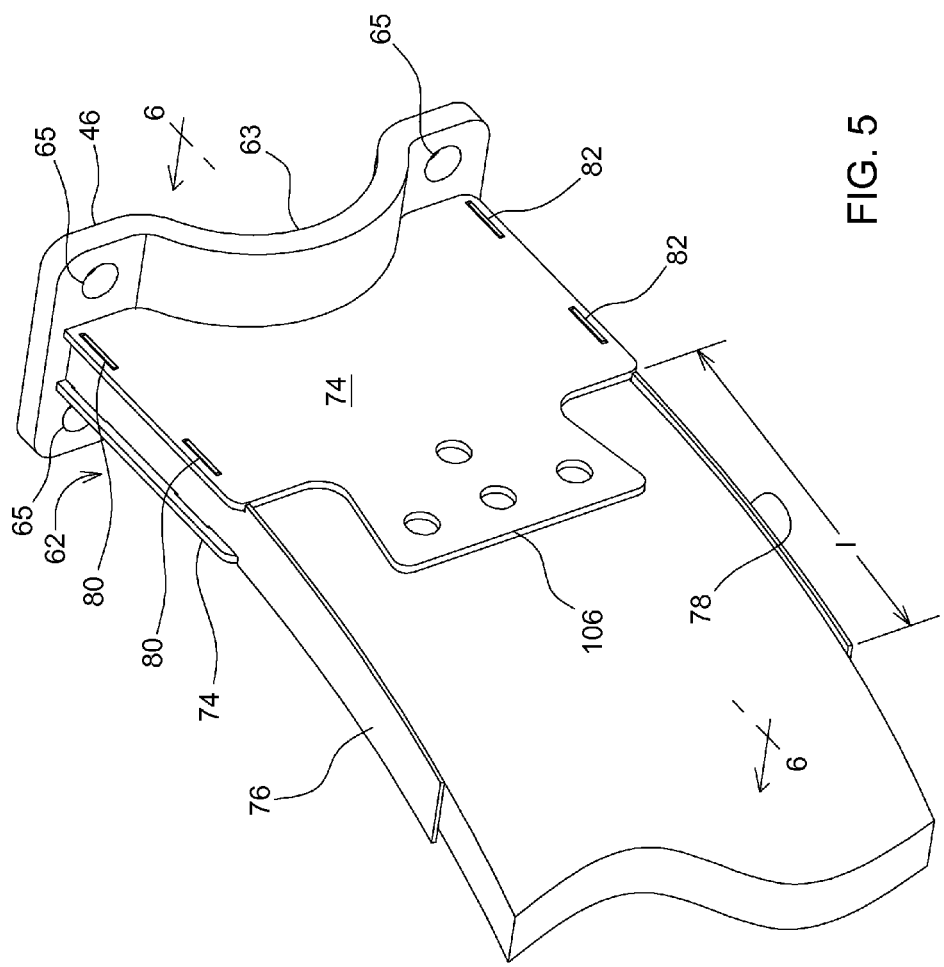
FIG. 5 is a left side perspective view showing the base section and a portion of the middle section of a twine delivery needle, like that shown in FIG. 1, but prior to a high strength, thin skin being added.
Figure 6:
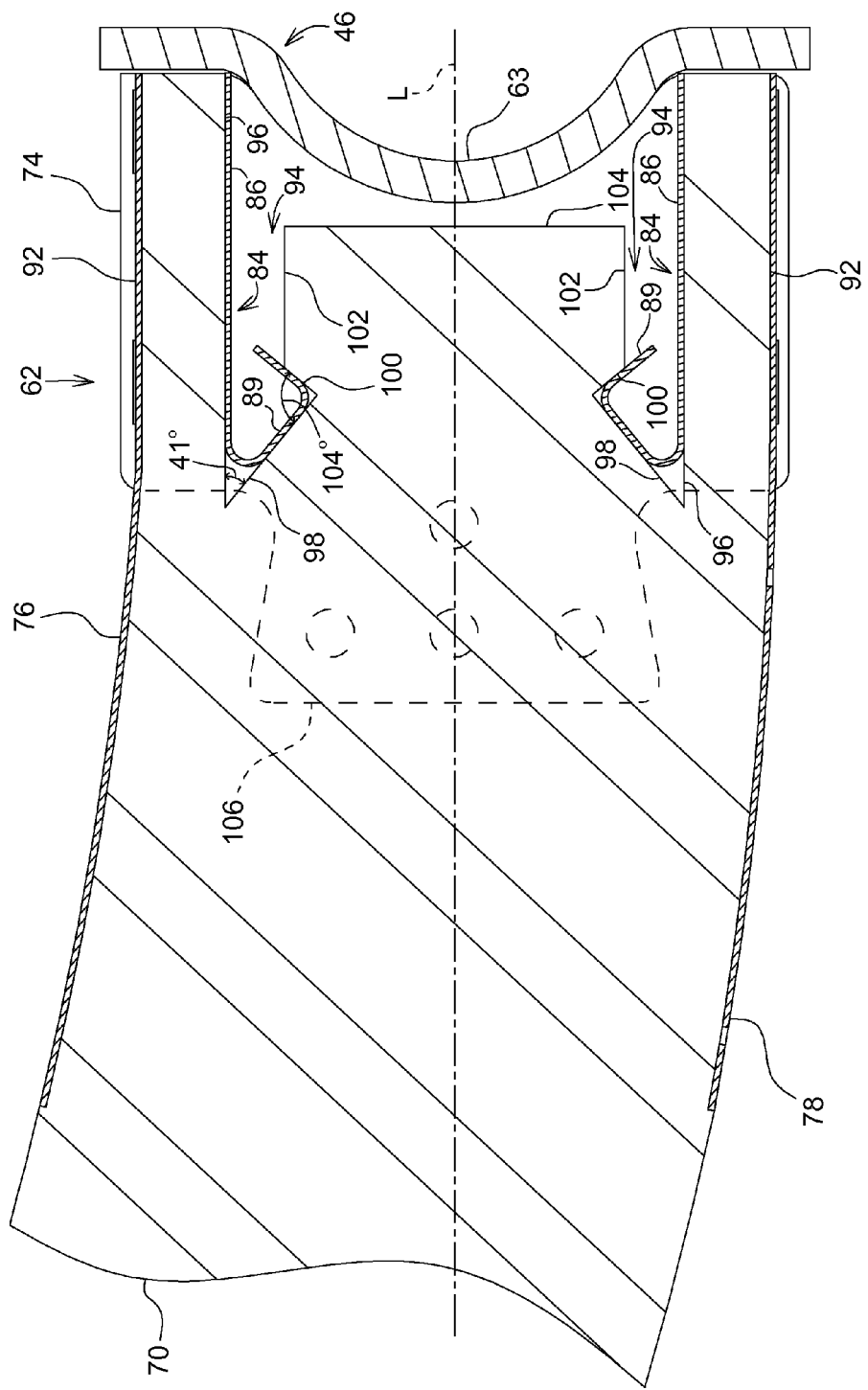
FIG. 6 is an enlarged, vertical sectional view taken along the line 6-6 of the metal base section shown in FIG. 5.
Figure 7:
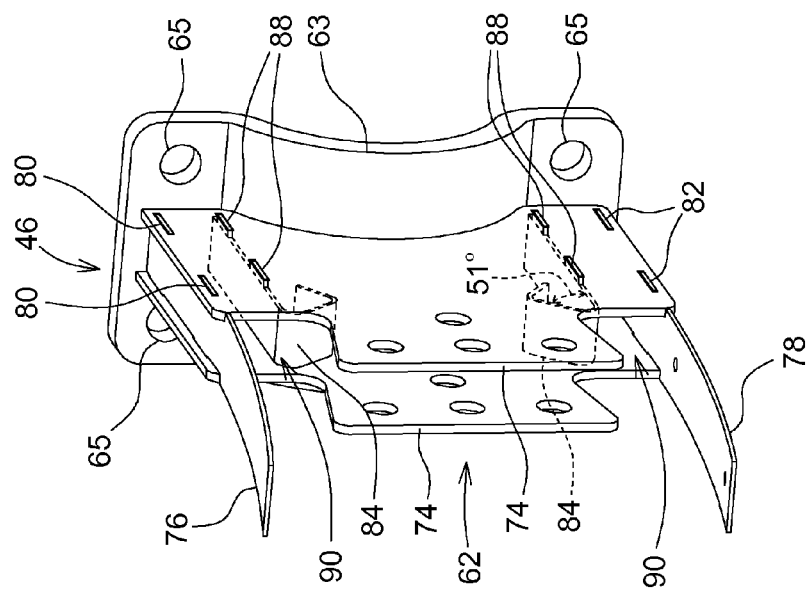
FIG. 7 is a left side perspective view of the metal base section shown in FIG. 5 before it is mounted to the base end of the foam core.

Referring now to FIGS. 5-7, it can be seen that the metal base section 62 of the needle 44 includes the base end connection plate 46, the latter being made from a rectangular metal plate having a thickness of 10 mm, for example, formed so as to have a cylindrically curved middle section 63 shaped complimentary to the tubular needle support member 34 and has opposite ends each provided with a pair of bolt holes 65 (FIGS. 5 and 7) located for being aligned with bolt holes similarly provided in opposite ends of a respective one of the mounting plates 48 carried by the support member 34. The base section 62 further includes a pair of identical, transversely spaced flat sheet metal plates 74 having a thickness of about 3 mm, for example, and having inner ends shaped to embrace, and being welded to, the base end connection plate 46 so that the plates 74 extend perpendicular to a central axis of the curved middle section 63 of the plate 46. Upper and lower, elongate sheet metal straps 76 and 78, respectively, also have a thickness of about 3 mm, for example, and are received between upper and lower margins of the plates 74, with each strap having an inner end welded to the base end connection plate 46. Opposite edges of the upper strap 76 are provided with two pair of oppositely projecting tabs 80 received in complementary-shaped slots provided in upper margins of the plates 74, and, similarly, opposite edges of the lower strap 78 are provided with two pair of oppositely projecting tabs 82 received in complementary shaped slots provided in the lower margins of the plates 74. The oppositely projecting tabs 80 and 82 are respectively welded in place to the upper and lower margins of the plates 74. Thus the base end connection plate 46, side plates 74 and straps 76 and 78 cooperate to define a socket or receptacle in which a complementary shaped base end of the composite middle section 66 of the needle 44 is snugly received. The interior of this socket or receptacle may be provided with locking elements which cooperate with a specially shaped base end region of the rigid foam core element 70 to lock the base end region of the core element 70 to the metal base section 62.

An example of such locking elements is shown in FIGS. 6 and 7 and includes a pair of identical spring metal locking elements 84 located between the receptacle side plates 74. As can best be seen in FIG. 6, the locking elements 84 are in the form of generally hook-shaped spring metal straps, each having a width dimension disposed at a right angle to the plates 74. The locking elements 84 each include a straight leg section 86 having opposite side edges provided with first and second pairs of oppositely projecting tabs 88 (FIG. 7) located in complementary shaped pairs of slots provided in the side plates 74, with an end of the straight leg section 86 being welded to the connection plate 46 and with the tabs 88 being welded to the side plates 74. The locking elements 84 each further include an approximately right-angular end section 89 having a first leg joined to, and defining an angle of about 51° with, the straight leg section 86, when the end section 89 is in an undeflected state as shown in FIG. 7, and having a second leg disposed with an end spaced from the straight leg section 86 so as to permit the end section 89 to be deflected towards the straight leg section 86, for a purpose to be explained. The straight leg sections 86 of the pair of locking elements 84 are respectively located at opposite sides of the curved middle section 63 of the base end connection plate 46 and extend in spaced, parallel relationship to the straps 76 and 78 so as to cooperate with the side plates 74 and straps 76 and 78 to define respective receptacle portions 90 (see FIG. 7) in which respective complementary-shaped base leg sections 92 of the core element 70 are received, with only one of the leg sections being shown in FIG. 6. The base end portion of the foam core element 70 is further profiled to define receptacles 94 for respectively receiving the right-angular end sections 89 of the locking elements 84. Specifically, one side of each of the receptacles 94 is defined by a respective inner surface 96 of the foam core base leg sections 92. A blind end of each of the receptacles 94 includes a surface 98 joined to an end of, and disposed at an angle of about 41° with respect to, an associated one of the base leg inner surfaces 96. Joined to the end of, and making an angle of approximately 104° with, each surface 98 is a relatively short surface 100 having an end joined to one end of a respective surface 102 extending in spaced, parallel relationship to the surface 96 and forming a second side of the receptacle 94, with the distance between the surfaces 96 and 102 being less than a maximum distance between the end section 89 and the leg section 86, which occurs when the end section 89 is not deflected, as shown at the bottom of FIG. 7. The base profile of the core element 70 is completed by an end surface 104 extending between and joined to ends of the respective surfaces 102 so as to define respective right angles with the surfaces 102.

Thus, when the rigid foam core element 70 of the needle 44 is being assembled to the metal base section 62, the base portion of the foam core element 70 is inserted into the receptacle defined by the base section, with the receptacle portions 90 respectively receiving the base leg sections 92 of the foam core element, and with the locking elements 84 entering the receptacles 94. Initially, the approximate right-angular sections 89 of the locking elements 84 are not deflected, with the maximum dimension between the leg sections 86 and the respective right-angular sections 89 being greater than the distance between the profile surfaces 96 and 102 of each receptacle 94. This requires that a force sufficient for causing the right angular sections 89 of the locking elements 84 to be deflected toward the straight sections by contact between the right-angular corner, defined between the surfaces 102 and surface 104, and respective leading leg portions of the right angular sections 89 be exerted when pressing the rigid form core element 70 into the base section 62. The right angular end sections 89 will be fully deflected as the surfaces 96 and 102 of the core element base profile as the core element 70 moves toward the connection plate 46 of the base section 62. When the surfaces 102 respectively move past the fully-deflected right angular end sections 89 of the locking elements 84, profile surfaces 100 will respectively permit the right-angular end sections 88 to expand slightly and effect a locking condition wherein the end sections 89 exert inwardly directed forces tending to center the base end of the foam core 70 relative to a base center line L, noting that the end sections 89 of the bottom and top locking elements 84, which are mirror images of each other, will be respectively received in the bottom and top receptacles 94, as shown in FIG. 6.

For the purpose of creating a strong connection between the base section 62 and the composite middle section 66, the ends of the side plates 74 located opposite from the ends welded to the connection plate 46 are each shaped to define a tab 106 extending away from the connection plate 46 (the illustrated tabs are dove tail shaped, but may be any desired shape, a truncated triangle shape, for example), and the sheet metal straps 76 and 78 each extend outwardly beyond the side plates 74 of the base section 62 by a length l which is more than half the total length of each of the straps 76 and 78 (see FIG. 5). The strong connection is formed by wrapping the portion of the rigid foam core element 70 extending between the bases of the tabs 106 and the free ends of the straps 76 and 78, together with the tabs and straps with one or more plies of woven and substantially continuous carbon or other desired fibers disposed within a matrix resin mat and then heat cured to form the hardened skin 72. It is here noted that it may be possible to omit the tabs 106 and still achieve a sufficiently strong connection between the base section 62 and core element 70.

Figure 8:
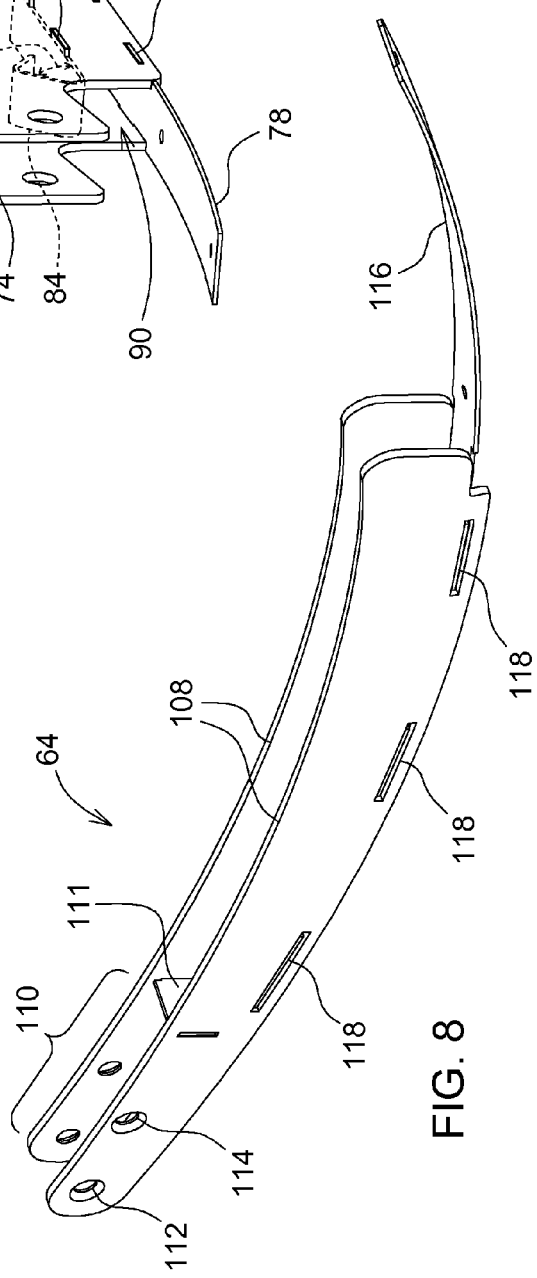
FIG. 8 is a left side perspective view of an enlarged metal tip section of the needle shown in FIG. 2 before it is mounted to an outer tip section of the foam core, but with the twine guide rollers removed.

Referring now to FIG. 8, there is shown the metal tip section 64 of the needle 44. The metal tip section 64 includes a pair of parallel, curved, elongate metal side plates 108 having a thickness of 3 mm, for example, and including an outer tip region 110 having an inner end defined by a cross plate 111 extending between the side plates 108 and having oppositely projecting tabs welded within slots provided in the side plates 108. The tip region 110 is provided with outer and inner pairs of axially aligned twine guide roller mounting holes 112 and 114. The aligned pairs of holes 112 and 114 are countersunk with the holes of each pair receiving countersunk screws, of which only left side screws 115 are shown (see FIG. 9), that are threaded one into the other and clamp the side plates 108 against opposite ends of respective inner and outer twine guide roller bearings (not visible) and thereby serve to fix the outer tip region of the plates 108 in parallel relationship to each other. Respectively mounted for rotating freely about the inner and outer roller bearings are inner and outer twine guide rollers 117 and 119. The length of the side plates 108, exclusive of the tip region 110 are held in a fixed parallel relationship to each other by an elongate sheet metal strap 116 having a thickness of 1.5 mm, for example, and being located between lower marginal regions of the side plates 108, as viewed in FIG. 8, and having three pairs of oppositely projecting tabs 118 (only one of each pair being visible) formed in spaced relationship to each other along opposite edges of the strap and welded in place in three pairs of aligned slots provided in the lower marginal regions of the side plates 108. The marginal portions of the side plates 108 together with the welded in strap 116 define a channel which serves as a shallow twine guide portion that extends beyond the twine guide channel 68 to the tip region 110. The strap 116 extends beyond inner ends of the side plates 108 by a distance approximately equal to 40% of the total length of the strap 116.

When the metal tip section 64 is assembled to the foam core 70, that portion of the strap 116 extending beyond the side plates 108 is located beneath the U-shaped twine guide channel 68 and is held in place by self-tapping screws (not shown) that extend through the channel 68, the strap 116, the skin 72 and into the rigid foam core element 70. Adhesive may be used together with, or in lieu of, the self-tapping screws for holding the non-welded section of the strap 116 in place. As with the base section 62, a strong joint between the foam core 70 and the tip section 64 can be achieved by placing a wrapping of fibers, carbon fibers, for example, together with a resin matrix about the foam core 70 and the unwelded, free section of the strap 116, and then curing the resin matrix to form the hard skin 72 about the foam core and the free section of strap 116.

Figure 9:
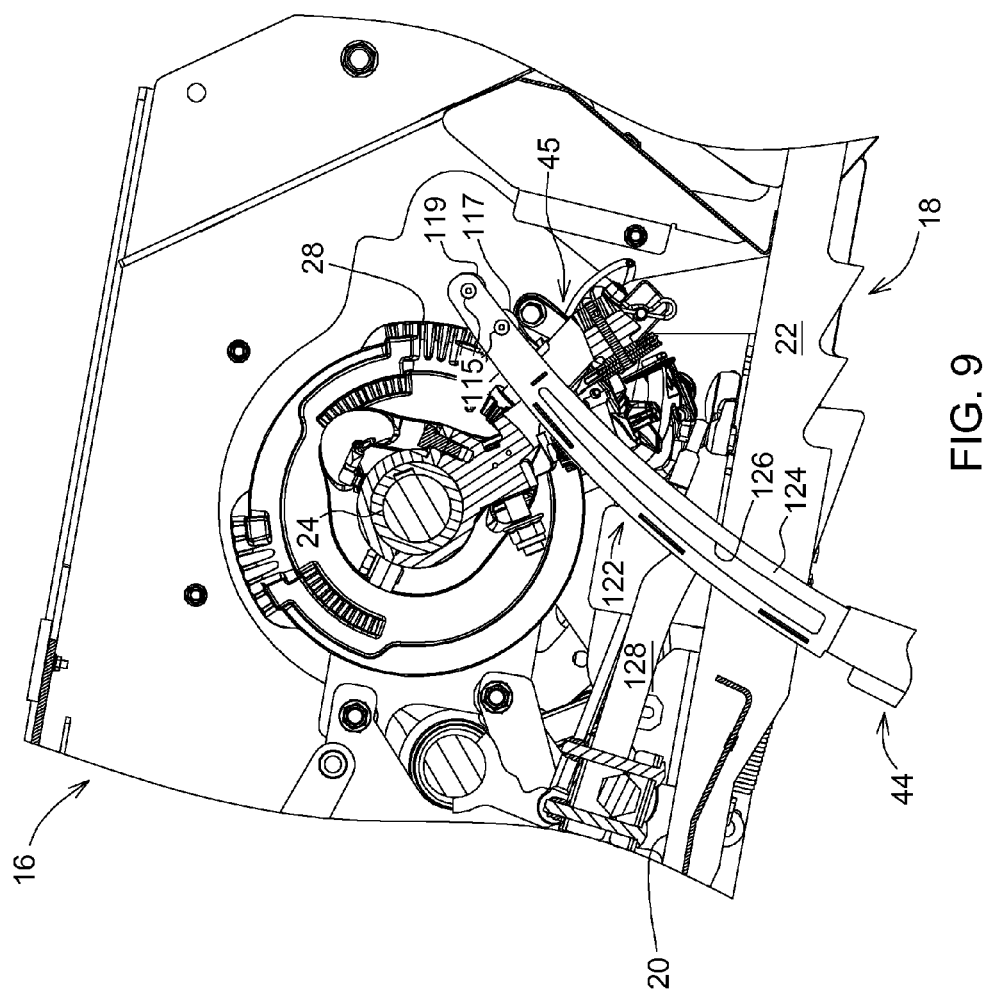
FIG. 9 is an enlarged right side view of a portion of the knotter table shown in FIG. 1, but with side panels removed, together with an upper end region of a twine-delivery needle having a metal tip section, which is a variant of that shown in FIGS. 1 and 2 in that elongate portions of opposite sides of the tip section are removed and define elongate openings, the needle being shown in the top dead center position shown in dashed lines in FIG. 1.

Referring now to FIG. 9, there is shown an interior portion of the knotter table 16 of FIG. 1 together with an upper portion of the needle 44, which in this case includes a metal needle tip section 122 that is a variant of the previously described tip section 64. The tip section 122 of the needle 44 is located in the top dead center position of the needle illustrated in dashed lines in FIG. 1, but from the opposite side of the baler. As previously described, the bottom wall 20 of the knotter table support frame 18 includes a plurality of the longitudinally extending members 22 spaced transversely from each other to define respective slots permitting passage of the needles 44, with only one of the longitudinal members 22 being shown, and it defines a left side of the needle passage slot in which the needle tip section 122 is located. The metal tip section 122 includes side plates 124 having an exterior contour which is substantially the same as that of the side plates 108 of the previously described metal tip section 64, but differing in that elongate openings 126 are provided in those portions of the length of side plates 124 that border opposite sides of the foam core 70, these openings resulting in the weight of the metal tip section 122 being less than the weight of the metal tip section 64.

Of importance is the fact that the metal side plates 124 and the metal side plates 108 of the metal tip section 64 have a length that extends from an extreme end of the metal tip sections to a location just below the longitudinal member 22 of the knotter table frame 18. The significance of this metal tip section length is that each needle 44 is set or adjusted to have an interference fit with, and rub against, one of the two longitudinal members 22 defining the slot in which the needle moves during tying operation, with the contacted side plate 124 of the metal tip section providing a durable wear surface. The interference fit is approximately 1/8 of an inch and dampens the dynamic vibrations of the needle 44 to allow the outer twine guide roller 119 to consistently catch the top twine, which is in engagement with a roller (not visible) carried by an associated twine position control arm 128. If a more detailed description of the twine position control arm is desired, it can be found in the aforementioned U.S. Pat. No. 8,671,834.

Another feature of the composite needles 44 is that, if any of the needles stall or are mistimed relative to the baler plunger such that the baler plunger engages the needle during a compression stroke, the engaged needle will shear without causing damage to the baler plunger or frame members of the baling chamber 12 or knotter table 16.

The operation of the twine delivery needles 44 in tying knots in strands of twine placed about formed bales is thought evident from the foregoing description and, for the sake of brevity, is not restated.

Having described the preferred embodiment, it will become apparent that various modifications can be made without departing from the scope of the invention as defined in the accompanying claims.

What is claimed is:

1. A baler twine-delivery needle comprising: an elongate, curved needle body including a metal tip section including a tip region carrying at least one twine guide roller, a metal mounting base section and a composite middle section extending between and being joined to each of said tip section and base section; said composite middle section including a foam board core wrapped in at least one ply of fibers disposed in a hardened matrix of a resin based material so as to define a skin about the foam board core.

2. The baler twine-delivery needle, as defined in claim 1 wherein opposite sides of the base section of the needle are constructed of sheet metal and include parallel tabs which straddle and are affixed to opposite sides of the composite middle section.

3. The baler twine-delivery needle, as defined in claim 1, wherein said tip section includes opposite sheet metal sides having a length sufficient for extending from an outer extreme of the tip section through a bottom of a knotter table when the needle is in a top dead center position penetrating the knotter table, the sheet metal sides of the tip section thereby providing a wear surface accommodating a set operating interference between the needle and the knotter table for damping dynamic vibrations of the needle to allow the needle to consistently catch a top twine held in its path of movement.

4. The baler twine-delivery needle, as defined in claim 3, wherein the needle includes a forward side, extending from the tip section to the base section; and a sheet metal strap of the tip section being located between, extending coextensive with, and being joined to, said sheet metal sides of the tip section to thereby cooperate therewith so as to form a tip section twine guide along the forward side of the tip section.

5. The baler twine-delivery needle, as defined in claim 4, wherein the sheet metal strap of includes a portion that extends beyond the sheet metal sides of the tip section and is fixed to a forward side of the composite middle section.

6. The baler twine-delivery needle, as defined in claim 5, wherein one of a second metal twine guide, and a plurality of metal twine guide segments, each having a U-shaped cross section and being shaped complementary to a region of the forward side of the needle, extends from one end of the tip section twine guide to the mounting base section, is fixed to said forward side of the needle.

7. The baler twine-delivery needle, as defined in claim 6, wherein the second metal twine guide is fixed to the forward side of the needle and covers the portion of the metal strap of said tip section which extends beyond the sheet metal sides of the tip section.

8. The baler twine-delivery needle, as defined in claim 4, wherein the sheet metal strap of the tip section is provided with tabs along opposite side edges thereof and wherein the sheet metal sides of the tip section are provided with slots receiving the tabs, with the tabs being welded in place to the sheet metal sides.

9. The baler twine-delivery needle, as defined in claim 2, wherein the needle includes a top dead center position wherein the needle extends from top-to-bottom through the baling chamber and the tip section is located at least partially above the baling chamber; and a curved metal twine guide having a U-shaped cross section being secured along the forward side of the twine-delivery needle.

10. The baler twine-delivery needle, as defined in claim 9, wherein said tip section includes opposite sheet metal sides, wherein said metal twine guide extends from said sheet metal sides of the tip section to the metal mounting base section.

11. The baler twine-delivery needle, as defined in claim 1, wherein said composite middle section includes a base end region, and wherein said metal mounting base section defines a socket receiving and being joined to said base end region of said composite middle section.

12. The baler twine-delivery needle, as defined in claim 1, wherein the composite middle section includes a base end region comprising first and second base leg sections spaced from each other in a direction transverse to a length of the needle; and said metal mounting base section defining first and second receptacle portions respectively receiving and being joined to said first and second base leg sections.

13. The baler twine delivery needle, as defined in claim 1, wherein said base section includes a parallel pair of sheet metal side plates joined at one end to a base connection plate defining a base end of the needle and respectively joined at first and second edge regions extending away from the connection plate by first and second sheet metal straps which cooperate with the side plates and the connection plate to define a socket receiving a base end region of the composite middle section of the needle; at least one locking element being fixed within said socket; and said base end region of the composite middle section defining a receptacle for receiving and cooperating with the locking element for establishing a locking connection between the base section and the composite middle section.

14. The baler twine delivery needle, as defined in claim 13, wherein said at least one locking element comprises a spring metal strap having a deflectable locking end section; and said receptacle being shaped for deflecting the locking end from an initial position during initial movement of the base end region of the composite middle section into said socket during assembly and then permitting the locking end to move back towards the initial position so as to establish a locking condition when the base end region is fully inserted into the socket.

15. The baler twine delivery needle, as defined in claim 13, wherein the first and second sheet metal straps of said base section extend beyond the socket and are wrapped with the at least one ply of fibers disposed in the hardened matrix of the resin based material whereby the skin extends about said sheet metal straps as well as about the foam board core so as to establish a connection between the metal base section and the composite middle section.

16. The baler twine delivery needle, as defined in claim 13, wherein the metal tip section includes opposite sheet metal side plates joined by an elongate sheet metal strap having a curvature that is complementary to a curvature of a side of an end region of the composite middle section; said end region of the composite middle section being located between the sheet metal side plates of the metal tip section with said side of the end region of said middle section being in engagement with said sheet metal strap; and said sheet metal strap of the tip section extending beyond said opposite sheet metal side plates of the tip section toward the base section and being wrapped with the at least one ply of fibers disposed in the hardened matrix of the resin based material whereby the skin extends about said sheet metal strap of the tip section as well as about the foam board core so as to establish a connection between the metal tip section and the composite middle section.

17. The baler twine delivery needle, as defined in claim 15, wherein the metal tip section includes opposite sheet metal side plates joined by an elongate sheet metal strap having a curvature that is complementary to a curvature of a side of an end region of the composite middle section; said end region of the composite middle section being located between the sheet metal side plates with said side of the end region being in engagement with said sheet metal strap; and said sheet metal strap of the tip section extending beyond said opposite sheet metal side plates of the tip section and toward the metal mounting base section and being wrapped with the at least one ply of fibers disposed in the hardened matrix of the resin based material whereby the skin extends about said sheet metal strap of the tip section as well as about the foam board core so as to establish a connection between the metal tip section and the composite middle section.

18. The baler twine delivery needle, as defined in claim 1, wherein said base section includes a parallel pair of sheet metal side plates having first ends joined to a base connection plate defining a base end of the needle, and having respective first and second edge regions extending away from the connection plate and joined to each other by first and second sheet metal straps which cooperate with the side plates and the connection plate to define a socket receiving a base end region of the composite middle section of the needle; at least one locking element being fixed within said socket; and said base end region of the composite middle section defining a receptacle for receiving and cooperating with the locking element for establishing a locking connection between the base section and the composite middle section.

19. The baler twine delivery needle, as defined in claim 18, wherein said at least one locking element comprises a spring metal strap having a deflectable locking end section; and said receptacle being shaped for deflecting the locking end from an initial position during initial movement of the base end region of the composite middle section into said socket during assembly and then permitting the locking end to move back towards the initial position so as to establish a locking condition when the base end region is fully inserted into the socket.

\* \* \* \* \*